June 24, 1958 A. F. KENYON ET AL 2,840,724

MAGNETIC AMPLIFIER REGULATING SYSTEM

Filed Dec. 29, 1955 4 Sheets-Sheet 1

June 24, 1958 A. F. KENYON ET AL 2,840,724

MAGNETIC AMPLIFIER REGULATING SYSTEM

Filed Dec. 29, 1955 4 Sheets-Sheet 2

MAGNETIC AMPLIFIER REGULATING SYSTEM

Filed Dec. 29, 1955 4 Sheets-Sheet 3

WITNESSES:
Bernard R. Giegucz
Leon J. Vaga

INVENTORS
Alonzo F. Kenyon, Donald E. Abell
and Robert E. Hull.
BY
Paul E. Friedemann
ATTORNEY

MAGNETIC AMPLIFIER REGULATING SYSTEM

Filed Dec. 29, 1955 4 Sheets-Sheet 4

2,840,724

MAGNETIC AMPLIFIER REGULATING SYSTEM

Alonzo F. Kenyon, Churchill, Pa., and Donald E. Abell, Buffalo, and Robert E. Hull, Eggertsville, N. Y., assignors to Westinghouse Electric Corporation, East Pittsburgh, Pa., a corporation of Pennsylvania Application December 29, 1955, Serial No. 556,140

19 Claims. (Cl. 307—84)

This invention relates to electric control systems and, more particularly, to magnetic amplifier controlled load units which may embody means for regulating the voltage output of generating means.

To better understand the merits and objects of this invention, a few statements with respect to the problems that gave rise to this invention may prove helpful.

Saturable core magnetic amplifiers are well known in the control art, and magnetic amplifier regulators have been used to excite and regulate large machines requiring up to 30 amperes excitation current at 80 volts under steady-state conditions and much higher transient excitation currents during field forcing. Thus far, applications have been made of magnetic amplifier regulators involving only a single main generator or motor. However, the demands are for ever larger and larger units.

For example, in a particular three-stand tandem cold metal (steel) strip mill, two 2,000 kilowatt generators are required for each of the three 5,000 horsepower motors driving each stand. When there are more stands, more generators are required. Further, much larger drives than the particular three-stand mill above mentioned are contemplated, which larger drives may require three or more main machines with corresponding increases in excitation power requirements.

Such increase in excitation power capacity can be obtained by interposing a rotating exciter between the control magnetic amplifier and the field windings of the generator, the excitation of which is to be controlled. There are no magnetic amplifiers now in existence that are large enough nor designed for such capacity. To develop new magnetic amplifiers with greater ampere and/or voltage rating to excite two or more large machines operating together would appear not to be an impossible task. However, such magnetic amplifiers would become rather bulky and heavy, and the design of such magnetic amplifiers poses many other difficult design problems. Further, every mill has some single machine drives as well as larger multi-machine drives. There is thus considerable attraction to the use of a number of power magnetic amplifiers which individually have a capacity for a single machine drive and in combination, if that can be accomplished, using two or three, or more power stage magnetic amplifiers for the large multi-machine drives.

One broad object of this invention is to so arrange the circuitry of two or more magnetic amplifiers to take care of large loads beyond the power capicity of one magnetic amplifier.

Another broad object of this invention is to interconnect several magnetic amplifiers so that the voltage distribution around the complete circuit is held to a relatively low value.

A further object of this invention is the provision of simple control means for a plurality of power magnetic amplifiers connected to supply a load beyond the capacity of any one of the power magnetic amplifiers.

It is also an object of this invention to supply a single load unit; having a capacity beyond the capacity of power magnetic amplifiers now available, from a plurality of power magnetic amplifiers connected in series sandwiched relation with the elements of the single load unit.

A more specific object of this invention is the interconnection of a plurality of magnetic amplifiers in sandwiched series relation with load units.

The objects recited are merely illustrative. Other objects and advantages will become more apparent from a study of the following specification and the drawings forming part of the disclosure, in which drawings.

Figure 1:
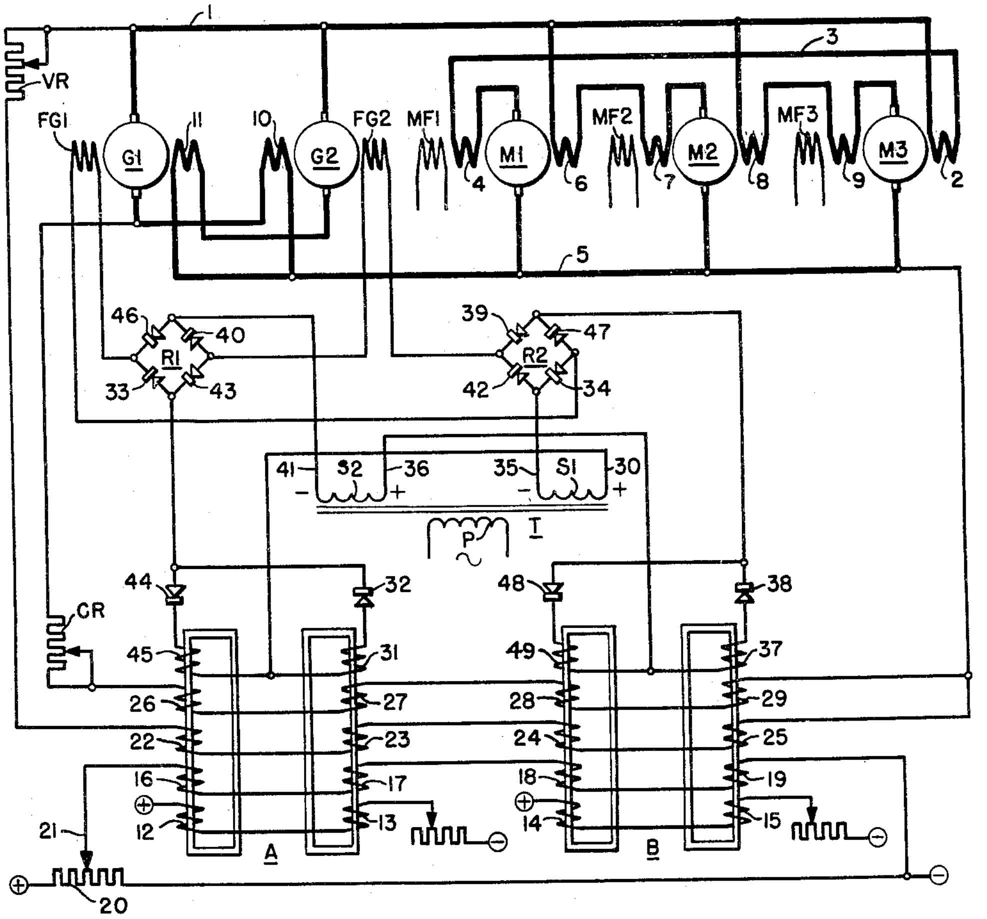
Figure 1 is a diagrammatic showing of the invention as applied to two generators, and showing direct control.

Referring to Fig. 1, it will be noted that the two generators G1 and G2 are connected to the load represented by the motors M1, M2 and M3. The load could be a single large motor as is often the requirement.

The generators G1 and G2 are connected to energize the leads 1 and 5. It will be noted that the circuit for motor M1 may be traced from lead 1 through the series field winding 2 of motor M3, conductor 3, the series field winding 4 and armature of motor M1, to the lead 5. Motor M2 is energized by the circuit through the series field winding 6 of motor M1, the series field winding 7 and armature of motor M2, to lead 5, and motor M3 is energized by the circuit through the series field winding 8 of the motor M2, the series field winding 9 and armature of motor M3, to lead 5. The motors are thus cross-excited for stable balanced operation. The motors also have field windings MF1, MF2 and MF3, respectively, which field windings may be energized from a suitable source and controlled in any suitable manner.

The armature circuit of generator G1, it will be noted, includes the series field winding 10 of generator G2, and the armature circuit of generator G2 includes the series field winding 11 of generator G1, thus providing for stable balanced operation of the two generators.

One of the essential features of this invention for the particular showing made in Fig. 1 is the control of the field windings FG1 and FG2 from the magnetic amplifiers A and B.

Magnetic amplifier A is shown with the bias windings 12 and 13, and magnetic amplifier B with the bias windings 14 and 15. The magnetic amplifiers are also provided with pattern windings. These pattern windings are connected in the circuit from the potentiometer 20 through tap 21, pattern windings 16 and 17 of magnetic amplifier A, and pattern windings 18 and 19 of magnetic amplifier B. To make the magnetic amplifiers responsive to both the voltage of the generators and the load current of the generators, the magnetic amplifiers are provided with two control windings. The control windings 22 and 23 of magnetic amplifier A and the control windings 24 and 25 of magnetic amplifier B are connected in series directly across the leads 1 and 5 through an adjusting resistor VR. The control windings 26 and 27 of magnetic amplifier A and the control windings 28 and 29 of magnetic amplifier B are connected in series, and are further connected in series with a control resistor CR across the field winding 10.

For the particular application shown in Fig. 1, the operation of the magnetic amplifiers is primarily that of a voltage regulator, and in consequence tap 21 will remain in a fixed position and the control windings of the magnetic amplifier will function to maintain the excitation of the generators such that proper voltage regulation of the generators is obtained.

The main windings of the magnetic amplifiers receive their alternating current energy from the transformer T, comprising a primary P and two secondary windings S1 and S2. To better understand the functions and contributions made by this invention, a detailed study of the function of the main windings of the magnetic amplifiers will be most helpful. When the terminal 30 of the secondary S1 is positive, a circuit is established from this terminal through the main winding 31 of magnetic amplifier A, rectifier 32, rectifier 33 of the full-wave rectifier R1, field winding FG1, rectifier 34 of the full-wave rectifier R2, to the left hand terminal 35 of the secondary S1. At the same time that terminal 30 is positive, terminal 36 of the secondary S2 is positive, and a circuit is established from this terminal through main winding 37 of the magnetic amplifier B, rectifier 38, rectifier 39 of the full-wave rectifier R2, field winding FG2, rectifier 40 of the full-wave rectifier R1 to the left hand terminal 41 of the secondary S2.

When terminal 35 is positive, a circuit is established through rectifier 42 of full-wave rectifier R2, field winding FG2, rectifier 43 of the full-wave rectifier R1, rectifier 44, main winding 45 of the magnetic amplifier A, to the terminal 30. At the same time that terminal 35 is positive, terminal 41 is positive, and a circuit is established from this terminal through rectifier 46 of the full-wave rectifier R1, field winding FG1, rectifier 47 of the full-wave rectifier R2, rectifier 48, main winding 49 of the magnetic amplifier B, to the right hand terminal 36 of the secondary S2.

Figure 2:
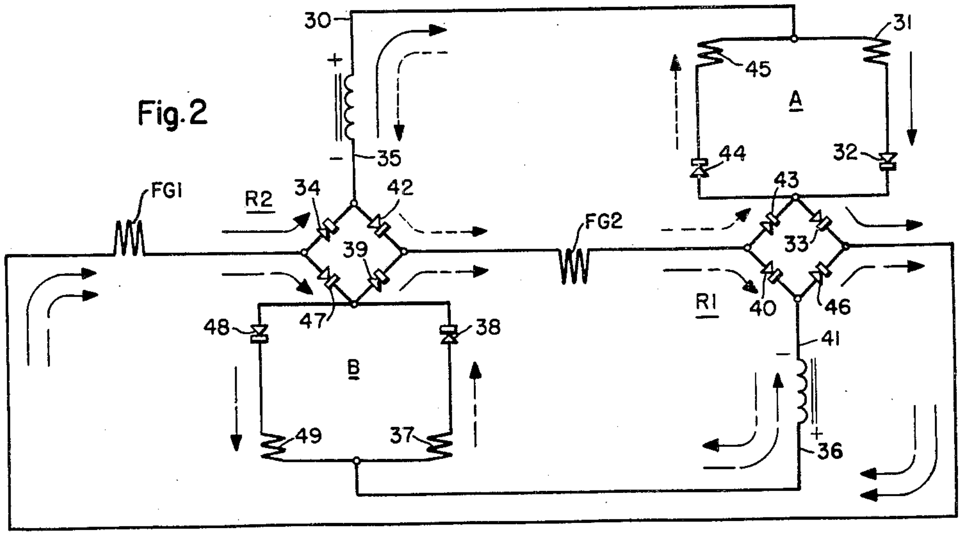
Fig. 2 is a brief and simplified showing of the main essential circuitry of the showing in Fig. 1.

In Fig. 2, the circuitry just traced with respect to the field windings FG1 and FG2 has been shown in very much more simplified manner, and it will be noted that when main winding 31 of the magnetic amplifier A is conducting, which we shall designate the positive half cycle, a current flows as indicated by the full line arrow through the field winding FG1. At that same instant that the main winding 31 is conducting, the main winding 37 is conducting and a current designated by the dot-dash arrow flows through field winding FG2, which is also the positive half cycle. On the negative half cycle, the main winding 45 of magnetic amplifier A is conducting, and a current flows as indicated by the arrow in dotted lines, and the excitation of field winding FG2 for the negative half cycle is effected by amplifier A. During this same negative half cycle, the main winding 49 of the magnetic amplifier B is active and a current will flow through the field winding FG1 in accordance with the dashed arrow adjacent that winding. It will be noted that the burden of the magnetic amplifier is in each instance only that of one field winding at a time and for one half of the alternating current cycle. On the second half of the alternating current cycle, the second magnetic amplifier assumes the burden for a particular field, whereas the first magnetic amplifier assumes the burden for the second field. This is a very important contribution to the art, since the voltage distribution is very much better than if an attempt had been made to use a single magnetic amplifier to control the two fields, and at no time is the voltage from any portion of the circuit to ground that of the total voltage necessary to excite the field windings if they had been in series, and supplied from a voltage source equivalent to the combined voltage sources of the two magnetic amplifiers.

Figure 3:
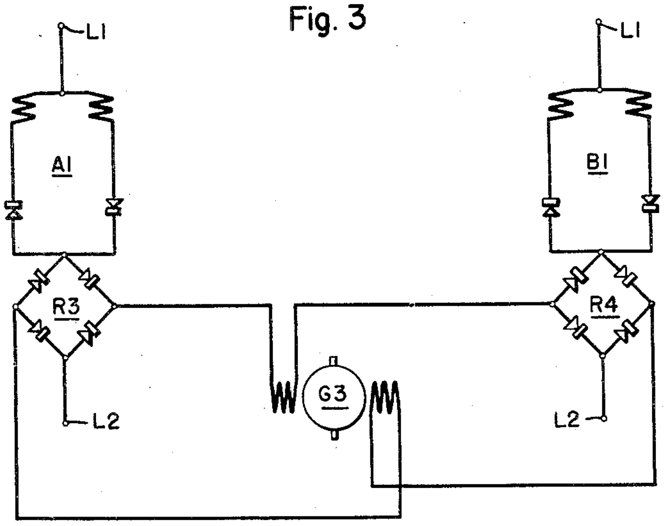
Figs. 3, 4 and 5 are simplified showings of the main essential circuitry of the invention as applied to a single generator, as in Fig. 3, to three generators, as in Fig. 4, and three magnetic amplifiers as applied to a single load unit, as in Fig. 5.

In the particular showings made in Figs. 1 and 2, the two load units are two separate and distinct fields for two separate generators. However, such an arrangement is not at all a necessity because the magnetic amplifiers can well be used in circuitry supplying a single load. This arrangement is shown in Fig. 3, where the leads L1, L2 represent the alternating current supply and may comprise sources as the outputs of two individual secondary windings, and the generator G3 having the two field windows is excited from the two magnetic amplifiers A1 and B1 through the full-wave rectifiers R3 and R4. Again in this arrangement, the load of the two field windings is alternately distributed, first to one magnetic amplifier and then to the other. Yet, there is no half-wave rectification but a full-wave rectification for the field windings of the generator G3.

Figure 4:
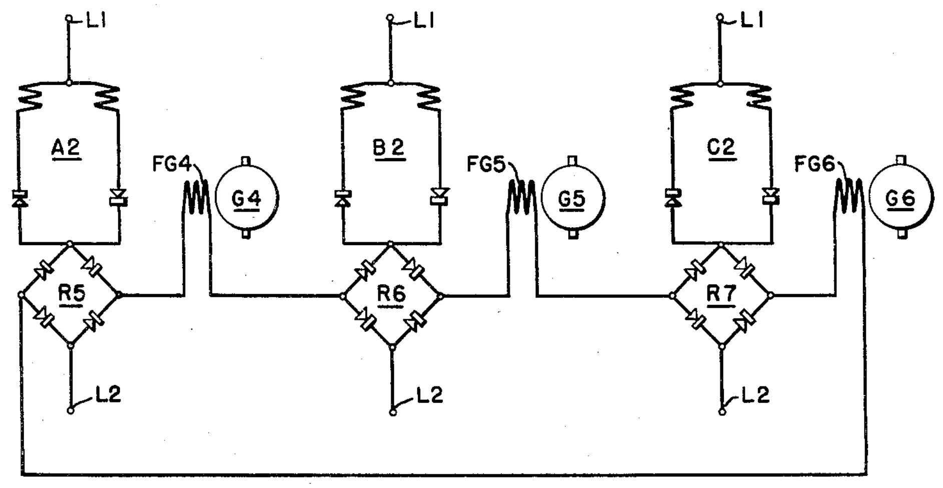

The contributions of this invention are not limited to the use of two magnetic amplifiers connected in a series sandwiched relation with the load units they control, but any number of magnetic amplifiers may be thus connected. For instance, in Fig. 4, three generators G4, G5 and G6 are shown, whose field windings FG4, FG5 and FG6, constituting the load units, are connected in series sandwiched relation with respect to the magnetic amplifiers A2, B2 and C2. Again, the rectification is the full-wave rectification by virtue of the circuits shown and the rectifiers R5, R6 and R7. Further, the loads of the magnetic amplifiers A2, B2 and C2 need not be separate fields of separate generators, but the field windings of a single generator G7 as shown in Fig. 5.

Figure 7:
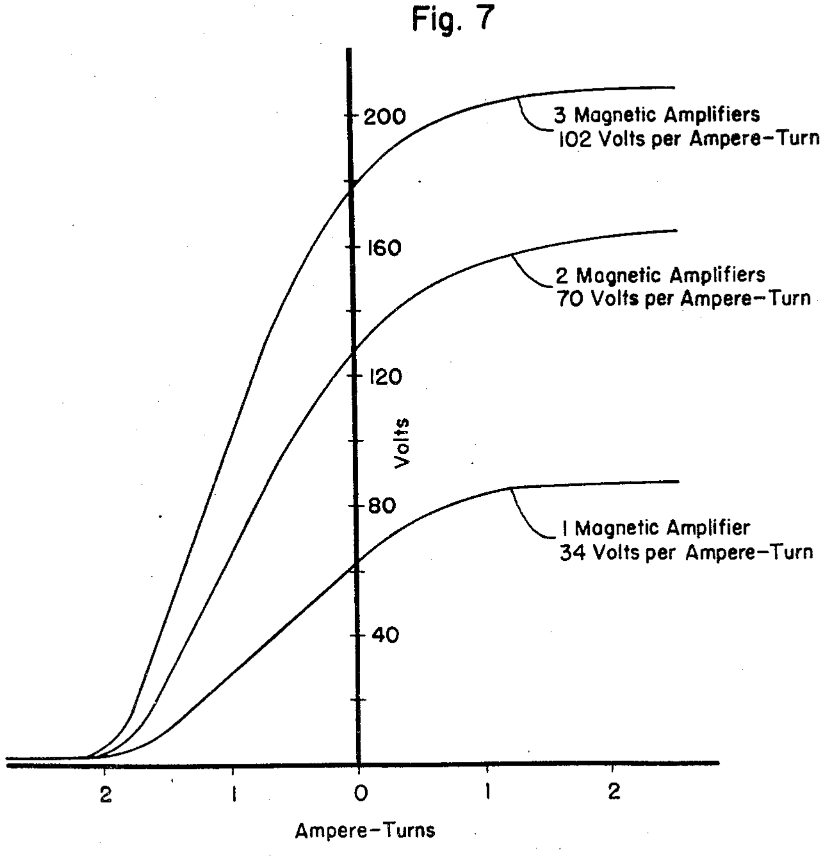
Fig. 7 shows some curves illustrating how the voltage output of a generator, as the one shown in Fig. 5, varied with the use of one to three magnetic amplifiers.
Figure 5:
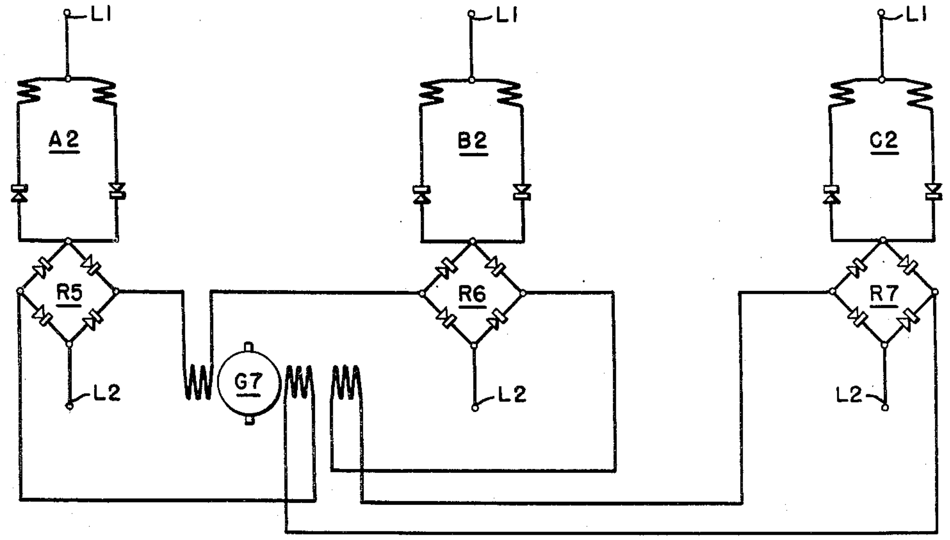

Fig. 7 shows some operating curves for the circuit arrangement shown in Fig. 5, where the field windings of the generator G7 have been excited, first by one magnetic amplifier as indicated by the lowest curve, then by two magnetic amplifiers as indicated by the intermediate curve, and then by three magnetic amplifiers as indicated by the curve showing the highest voltage.

The novel circuitry which constitutes the contribution to the art is not limited to the direct control of power magnetic amplifiers, but such power magnetic amplifiers may be disposed in the second stage of amplification where a first stage magnetic amplifier receives the control intelligence and the power amplifier control windings are connected to the output of the first stage magnetic amplifier.

Figure 6:
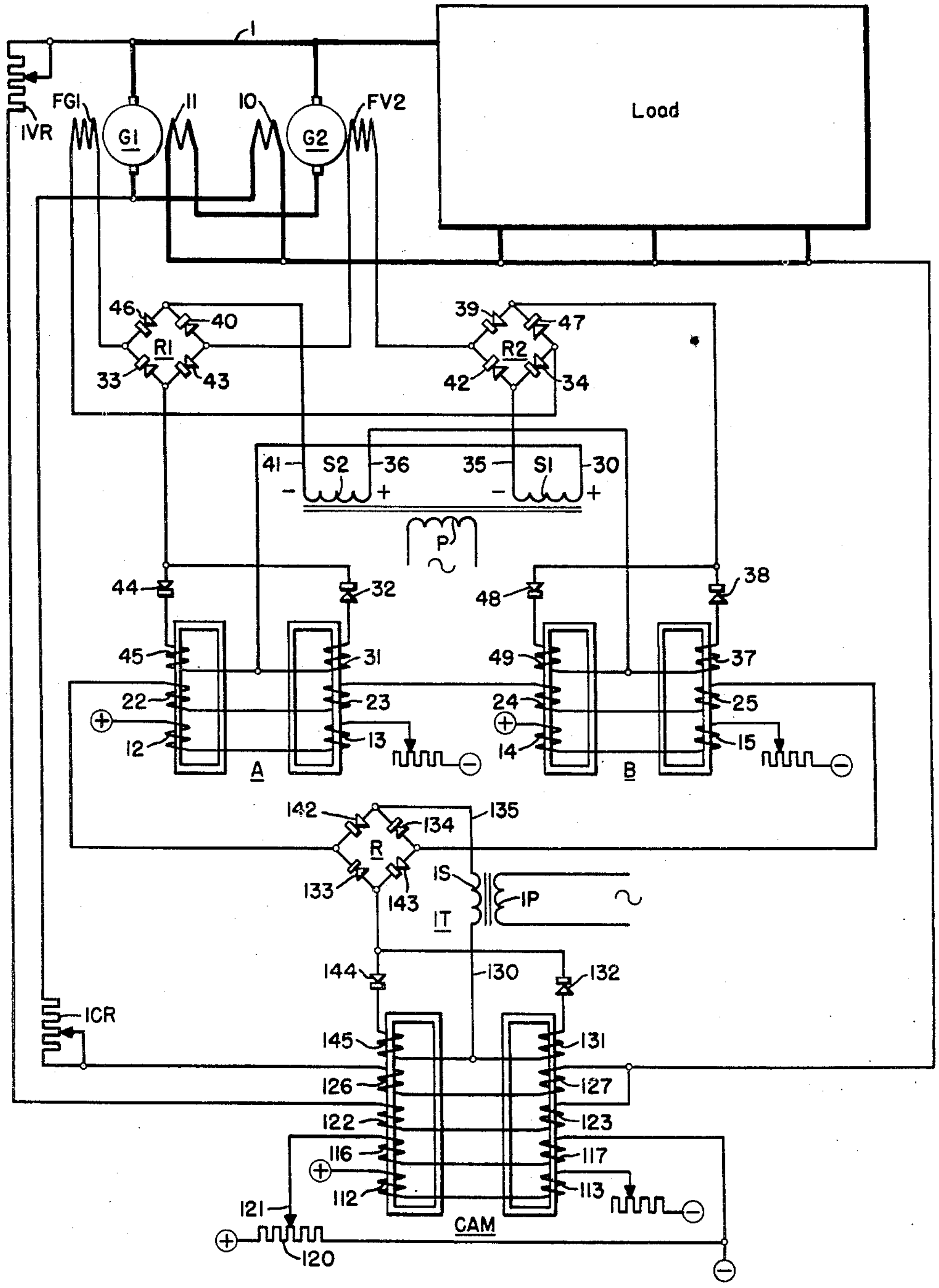
Fig. 6 is a diagrammatic showing of the invention in some detail wherein the power magnetic amplifiers are controlled from a first stage control magnetic amplifier.

In the showing in Fig. 6, the same reference characters have been used as in Fig. 1, where the elements referred to are the same, but reference characters with a (1) preceding the same number have been used for the magnetic amplifier CAM to differentiate these windings from those shown in Fig. 1.

The control magnetic amplifier CAM is provided with the bias windings 112 and 113, the pattern windings 116 and 117 connected by the tap 121 to the potentiometer 120, and is provided with the control windings 122 and 123 connected in series with the adjustable resistor 1VR across the output terminals of the voltage of the generators G1 and G2, and the control windings 126 and 127 are connected in series with the adjustable resistor 1CR across the field winding 10 of generator G2.

The main windings 131 and 145 of the control magnetic amplifier CAM receive their alternating current from the transformer 1T having the primary 1P and secondary 1S. When the terminal 130 of the secondary 1S is positive, a current will flow through the main winding 131, rectifier 132, rectifier 133 of the full-wave rectifier R, control windings 22 and 23 of the power amplifier A, and control windings 24 and 25 of the power amplifier B, through rectifier 134 of the full-wave rectifier R to the terminal 135 of the secondary 1S. When the secondary terminal 135 is positive, a circuit is established through rectifier 142 of the full-wave rectifier R, control windings 22, 23, 24 and 25, control rectifier 143 of the full-wave rectifier R, rectifier 144, and main winding 145 to the other terminal 130 of the secondary 1S. It is thus apparent that the main or power amplifiers A and B are controlled very similar to the control discussed in connection with Fig. 1, except that the control is effected by the magnetic amplifier CAM. The rest of the circuitry need not be discussed in detail since the discussion of Fig. 1 applies to this Fig. 6.

Again, it will be noted that all the advantages obtained from the circuitry shown and described in connection with the other figures are inherent to the showing of Fig. 6, and the additional advantages obtained that a relatively small control magnetic amplifier may be used to control two power magnetic amplifiers.

While a relatively few circuit arrangements have been shown and described, it is readily apparent, particularly to those skilled in the art, that other series sandwiched connections of magnetic amplifiers may be provided, all falling within the spirit and scope of this invention. The description and showing is therefore not to be taken in a limiting sense but is being presented merely as illustrative of the contribution of the art.

We claim as our invention:

1. In an electric system of control for controlling the operation of a pair of electrical load devices and being operative with a source of alternating current having first and second terminals, a first full-wave rectifier connected to each of said pair of load devices, a second full-wave rectifier connected to each of said pair of load devices, the rectifiers being so poled that direct current can traverse each of said load devices only in one direction, a first self-saturating magnetic amplifier and a similar second magnetic amplifier, with said first terminal of the alternating current supply being connected to the first alternating current terminals of the two full-wave rectifiers and the second terminal of the alternating current supply being connected to the input terminals of the magnetic amplifiers, and with the output terminals of the two magnetic amplifiers being connected respectively to the second alternating current terminals of the full-wave rectifiers.

2. In an electric system of control for controlling the operation of a pair of load devices, in combination, a first full-wave rectifier connected to each of said load devices, a second full-wave rectifier connected to each of said load devices, the rectifiers being so poled that direct current can traverse the load devices only in one direction, an alternating current supply comprising a first terminal and a second terminal, a first self-saturating magnetic amplifier and a similar second magnetic amplifier, said first terminal of the alternating current supply being connected to the first alternating current terminals of the two full-wave rectifiers and the second terminal of the alternating current supply being connected to the input terminals of the magnetic amplifiers, with the output terminals of the two magnetic amplifiers being connected respectively to the second alternating current terminals of the full-wave rectifiers.

3. In an electric system of control for controlling the operation of two load devices and operative with a supply of alternating current including a first terminal and a second terminal, the combination of a first full-wave rectifier having direct current output terminals respectively connected to a different one of said load devices, a second full-wave rectifier having direct current output terminals respectively connected to a different one of said load devices, a first self-saturating magnetic amplifier having first and second main windings and first and second saturating rectifier devices, a second self-saturating magnetic amplifier having first and second main windings and first and second saturating rectifier devices, a first series circuit including a first main winding for the first magnetic amplifier and said first saturating rectifier, with the latter first saturating rectifier being poled to be conductive away from the latter said winding, and a second series circuit including the second main winding and said second saturating rectifier of said first magnetic amplifier with the latter second saturating rectifier being poled to be conductive toward the latter said winding, with each of said first and second full-wave rectifiers having alternating current input terminals, said first and second series circuits being connected in parallel and between the first supply terminal and a first alternating current input terminal of the first full-wave rectifier, a third series circuit including said first main winding and said first saturating rectifier of the second magnetic amplifier with the latter said first saturating rectifier being poled to be conductive toward the latter said first main winding, and a fourth series circuit including the second main winding and the second saturating rectifier of the second magnetic amplifier, with the latter said second saturating rectifier being poled to be conductive away from the main winding connected in series with it, said third and fourth series circuits being connected in parallel and between the first supply terminal and first alternating current terminal of the second full-wave rectifier, said second terminal of the supply being connected to the second alternating current terminals of the full-wave rectifiers.

4. In an electric system of control for controlling the operation of two load devices and operative with a source of alternating current including a first terminal and a second terminal, the combination of a first series circuit including a first load device, the negative and positive terminals of a first full-wave rectifier, a second load device and the negative and positive terminals of a second full-wave rectifier, a first self-saturating magnetic amplifier, and a second self-saturating magnetic amplifier, a second series circuit including a main winding for the first magnetic amplifier and a saturating rectifier, and a third series circuit similar to the first series circuit except that the saturating rectifier is oppositely poled with respect to the main winding connected in series with it, said second and third series circuits being connected in parallel across the first supply terminal and the first alternating current terminal of the first full-wave rectifier, a fourth series circuit including a main winding for the second magnetic amplifier and a saturating rectifier, and a fifth series circuit similar to the third series circuit except that the saturating rectifier is oppositely poled with respect to the main winding connected in series with it, said fourth and fifth series circuits being connected in parallel across the first supply terminal and first alternating current terminal of the second full-wave rectifier, and with said second terminal of the supply being connected to the second alternating current terminals of the first and second full-wave rectifiers.

5. In an electric system of control operative with a supply of alternating current, in combination, a first load device, a first full-wave rectifier, a second load device, and a second full-wave rectifier, with said first and second load devices and said first and second full-wave rectifiers being connected in a series circuit in a predetermined relation of the first load device, then the first rectifier, then the second load device and then the second rectifier, with the first and second rectifiers being so poled that current can flow through the seres circuit in one direction only, a first self-saturating magnetic amplifier connected to said alternating current supply and to the first and second alternating current terminals of the first and second full-wave rectifiers, a second self-saturating magnetic amplifier connected to said alternating current supply and to the second and first alternating current terminals of the first and second full-wave rectifiers, whereby the first magnetic amplifier provides a load current during the positive half cycle of said alternating current to the first load unit and a load current during the negative half cycle to the second load unit, and the second magnetic amplifier provides a load current during the positive half cycle of said alternating current to the second load unit and a load current during the negative half cycle to the first load unit.

6. In an electric system of control operative with a supply of alternating current, in combination, a first load device, a first full-wave rectifier, a second load device, and a second full-wave rectifier, with said load devices and said first and second rectifiers being connected in a common series circuit in a predetermined relation of the first load device, then the first rectifier, then the second load device and then the second rectifier, with the first and second rectifiers being so poled that current can flow through the common series circuit in one direction only, a first self-saturating magnetic amplifier connected to said alternating current supply and to the first and second alternating current terminals of the first and second full-wave rectifiers, a second self-saturating magnetic amplifier connected to said alternating current supply and to the second and first alternating current terminals of the first and second full-wave rectifiers, whereby the first magnetic amplifier provides a load current during the positive half cycle of said alternating current to the first load device and a load current during the negative half cycle to the second load device, and the second magnetic amplifier provides a load current during the positive half cycle of said alternating current to the second load device and a load current during the negative half cycle to the first load device, and control windings operably connected to said first and second load devices for controlling the outputs of said magnetic amplifiers.

7. The control system of claim 6, with each of said load devices comprising the field winding of an alternator, and with said control windings being responsive to the voltage output of said alternator, whereby the alternator voltage output may be kept constant.

8. The control system of claim 6, with each of said load devices including the field winding of an alternator, and with said control windings being responsive to the voltage output of said alternator, whereby the alternator voltage output may be kept constant, and further control windings for each of said magnetic amplifiers for selecting the point of operation of the respective magnetic amplifiers.

9. In an electric system of control operative with a suitable source of alternating current, in combination, a plurality of load devices, an equal number of full-wave rectifiers, and an equal number of self-saturating magnetic amplifiers energized by said source of alternating current, with said load devices and said full-wave rectifiers being connected in a common series circuit in the relation of a first load device, a first rectifier, a second load device, a second rectifier, and so on including all of said load devices and said rectifiers and with the last of said rectifiers being disposed between the last load device and said first load device, and with said rectifiers being so poled that direct current only can flow in said common series circuit in a given direction, said first magnetic amplifier being interconnected with the first alternating current terminal of the first full-wave rectifier and the second alternating current terminal of the last full-wave rectifier, the second magnetic amplifier being interconnected with the first alternating current terminal of the second full-wave rectifier and the second alternating current terminal of the first full-wave rectifier, and so on to the last magnetic amplifier which is interconnected with the first alternating current terminal of the last full-wave rectifier and the second alternating current terminal of the next-to-the-last full-wave rectifier.

10. In an electric system of control operative with a source of alternating current, in combination, a plurality of load devices, an equal number of full-wave rectifiers, and an equal number of self-saturating magnetic amplifiers energized by said source of alternating current, with said load devices and said full-wave rectifiers being connected in a common series circuit in the following relation of a first load device, a first rectifier, a second load device, a second rectifier, and so on until the common series circuit is closed with the last rectifier disposed between the last load device and the first load device, and with the rectifiers being so poled that direct current only can flow in the common series circuit in a given direction, said first magnetic amplifier being interconnected with the first alternating current terminal of the first full-wave rectifier and the second alternating current terminal of the last full-wave rectifier, the second magnetic amplifier being interconnected with the first alternating current terminal of the second full-wave rectifier and the second alternating current terminal of the first full-wave rectifier, and so on around said series circuit to the last magnetic amplifier which is interconnected with the first alternating current terminal of the last full-wave rectifier and the second alternating current terminal of the next-to-the-last full-wave rectifier, and control windings for each of said magnetic amplifiers operatively connected to said load devices to control the direct current flowing in the loop circuit as a predetermined function of the operation of said load devices.

11. The control system according to claim 2, with each of said load devices including the field winding of a different one of a pair of generators, and a control winding for each of said magnetic amplifiers, with one of said control windings of the magnetic amplifiers being connected to the output terminals of one of the generators to thus regulate for constant voltage output of the generators.

12. The control system in accordance with claim 1, with said load devices comprising a pair of generators connected respectively to suitable load circuits, said generators having cross-connected series field windings so that the loads assumed by said generators remain balanced, and with said magnetic amplifiers each having a plurality of control windings, with one of said control windings for each magnetic amplifier being responsive to the output voltage of one of said generators to control the output of its respective magnetic amplifier as a function of said generator voltage, and one of said windings for each magnetic amplifier being responsive to the load current of one of the generators.

13. The control system in accordance with claim 1, with each of said load devices comprising the field winding of an electrical generator, said magnetic amplifiers each having a control winding energized as a function of the output voltage of one of the generators to thus provide voltage regulation for said generator.

14. The control system in accordance with claim 1, with each of said load devices comprising the field winding of an electric generator, with said magnetic amplifiers each having a pair of control windings, one control winding of each magnetic amplifier being energized as a function of the output voltage of said generator to thus provide voltage regulation for said generator, and one control winding of each magnetic amplifier being adjustable to cause said respective magnetic amplifiers to operate at selected points of their operating characteristics, with said selected points being the same.

15. The control system of claim 1, with each of said load devices comprising the exciting winding of an electric generator, and said magnetic amplifiers each having control windings, an additional magnetic amplifier, with said control windings being connected to be energized by the output of the additional magnetic amplifier.

16. The control system of claim 1, with each of said load devices comprising the exciting winding of an electric voltage generating means, said magnetic amplifiers each having a control winding, a third magnetic amplifier, each of said control windings being connected to be energized by the output of the third magnetic amplifier, with said third magnetic amplifier having a control winding responsive to the output voltage of the voltage generating means.

17. The control system of claim 1 operative with a pair of generators connected in parallel to a suitable load, said generators each having a field winding, with each of said field windings constituting one of the said load devices, said magnetic amplifiers each having a control winding, a third magnetic amplifier, each of said control windings being connected to be energized by the output of the third magnetic amplifier, with said third magnetic amplifier having a control winding responsive to the voltage of the generators and having another control winding responsive to the load current of the generators and having still another control winding to adjust the operating characteristics of the third magnetic amplifier.

18. In an electric control system for first and second load devices and being operative with a source of alternating current, with each of said load devices having an input and an output, the combination of a first full-wave rectifier having alternating current terminals and having direct current terminals, with the latter direct current terminals being respectively connected between the input of said first load device and the output of the second load device, a second full-wave rectifier having alternating current terminals and having direct-current terminals, with the latter direct current terminals being respectively connected between the input of the second load device and the output of the first load device, with said first and second full-wave rectifiers being poled such that current can flow through each of said first and second load devices in only one direction, a first magnetic amplifier connected in series with the alternating current terminals of said first full-wave rectifier and to said alternating current source, and a second magnetic amplifier connected in series with the alternating current terminals of said second full-wave rectifier and to said alternating current source.

19. The control system of claim 18, with each of said load devices comprising the field winding of respectively first and second electrical generators, and with each of said first and second magnetic amplifiers including a control winding connected to respond to the output voltage of said respective electric generators.

References Cited in the file of this patent

UNITED STATES PATENTS

| | | |
|---|---|---|
| 2,663,833 | Fisher | Dec. 22, 1953 |
| 2,707,253 | Albert | Apr. 26, 1955 |
| 2,709,774 | Wells | May 31, 1955 |
| 2,725,519 | Malick et al. | Nov. 29, 1955 |
| 2,735,060 | Malick | Feb. 14, 1956 |